March 17, 1953  J. H. DUXBURY  2,631,461
BELT PULLEY

Filed June 1, 1950  2 SHEETS—SHEET 1

INVENTOR
JOHN H. DUXBURY
BY George B. Ohzevolk
ATTORNEY

March 17, 1953   J. H. DUXBURY   2,631,461
BELT PULLEY

Filed June 1, 1950  2 SHEETS—SHEET 2

INVENTOR
JOHN H. DUXBURY

BY George B. Olzevolk

ATTORNEY

Patented Mar. 17, 1953

2,631,461

UNITED STATES PATENT OFFICE 2,631,461

BELT PULLEY

John Henry Duxbury, Middleton Junction, Manchester, England

Application June 1, 1950, Serial No. 165,439
In Great Britain February 16, 1948

1 Claim. (Cl. 74—230.4)

This invention relates to pulleys of the built up type.

The object of this invention is to provide a construction which will give great strength for the fastening between the spokes and the rim and to distribute the strain exerted on any part of the width of the rim more evenly by taking advantage of various principles of mechanics.

The present invention can best be illustrated by reference to the accompanying drawings in which.

Figure 4:
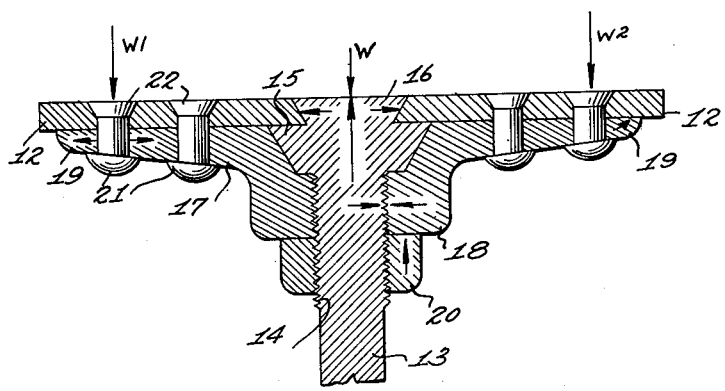

Figure 4 graphically illustrates the action of some of the forces acting upon the rim of the pulley, with particular reference to the present invention.

One of the problems to be solved in operating machinery with pulleys and belting has always been to provide a construction for the pulley which will give great strength for the fastening between the spokes of the pulley and the rim and at the same time distribute the action of the forces of the load over the rim, spokes and center boss of the pulley by taking advantage of the best known principles of mechanics so as to absorb the actions of the more powerful parallelograms of forces exerted by the load. This is accomplished by employing leverage and counter forces in such a way that no undue force is exerted against any part of the rim of the pulley, but on the contrary, during the entire operation, the actions of the principal parallelograms of force acting on the rim are directed in such a way that the resultant force is immediately absorbed by the center boss and thus transmitted to the center of the pulley, which center is at the same time the center of the moments of all the forces acting upon the pulley.

The present invention distributes the actions of the forces caused by the load on the rim by means of leverage and counterforce so that the pulley will not break, crack, or chip or be subjected to any undue strain due to the forces acting upon it during its normal operation.

Figure 1:
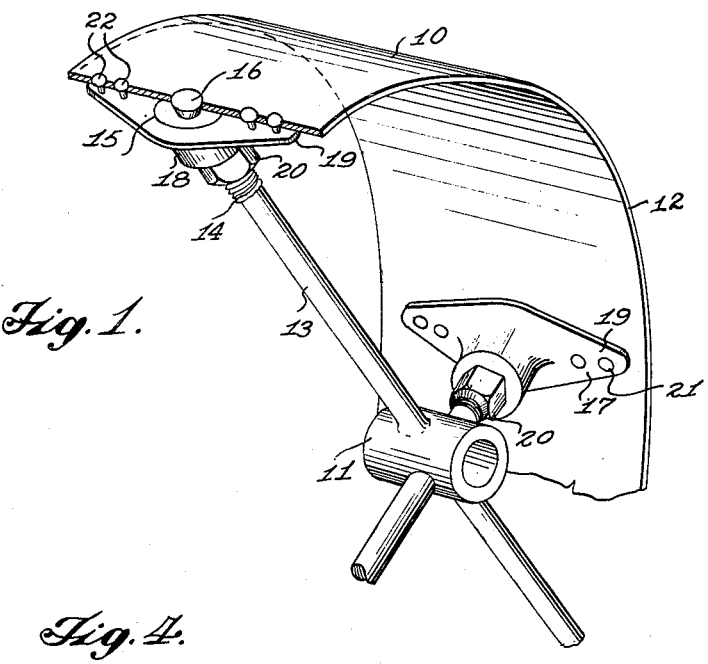
Figure 1 shows a part of a pulley constructed according to my invention.
Figure 2:
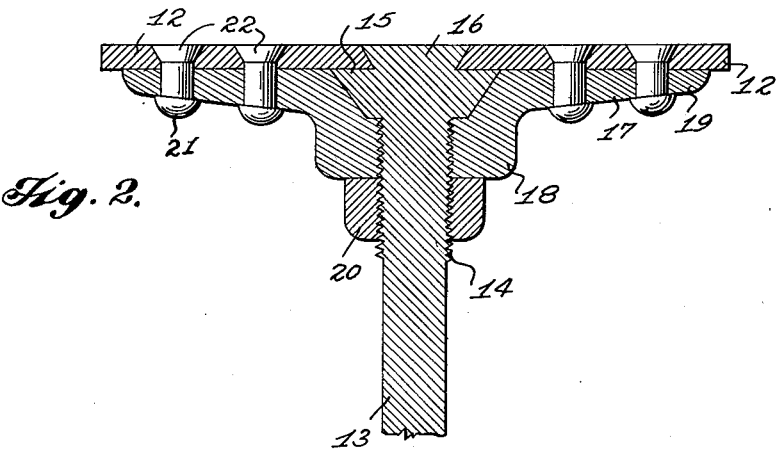
Figure 2 shows a cross sectional view of one of the spokes of the pulley along the line 1—1 of Figure 1.
Figure 3:
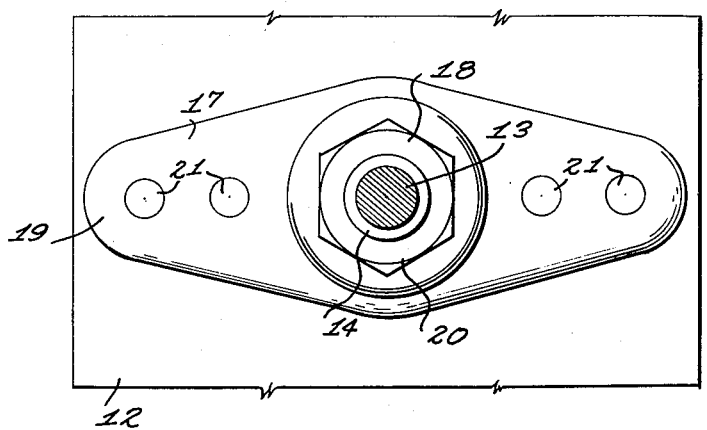
Figure 3 shows a cross sectional view through the spoke of the pulley shown in Figure 2 when viewed from underneath.

Referring now to the drawings, Figures 1, 2, and 3, in which like numerals indicate like parts throughout the same; numeral 10 shows the complete pulley, 11 shows the center boss, 12 shows the rim of the pulley, 13 shows the spoke of the pulley, 14 shows the collar or threaded part of the spoke, 15 shows the shoulder of the collar of the spoke, 16 shows the neck of the spoke, 17 shows the reinforcing plate in which 18 is the boss of said reinforcing plate and 19 the wing of said plate, 20 is the lock nut, 21 the rivets and 22 the neck of the rivets.

Figure 4 merely illustrates the action of the various forces acting on the rim, in the same manner that one would illustrate the actions of various loads on a lever, the conventional symbols of W, and $W_1$, $W_2$, etc. representing loads and arrows to show the forces being used.

The present invention 10 is applicable to pulleys made from any material and the center boss 11 should be sufficiently strong to absorb any force exerted against it during the normal usage of the pulley. The rim of the pulley 12 should of course be of metal and have tapered apertures through which are passed the necks of the spokes and the rivets. The spoke 13 has a collar 14 and said collar has a shoulder 15 which is tapered towards the edges of the rim as shown in Figure 2. The neck of the spoke 16 is passed through the proper aperture in the rim and afterwards burred or otherwise treated to cause the ends to expand or spread within the holes or apertures, thereby becoming locked to the rim. The reinforcing plate 17 is securely screwed on to the neck of the spoke and consists of a boss 18 and a tapered wing 19. Said reinforcing plate 17 is securely held in place by a lock nut 20 also screwed on to the collar of the spoke 14. There are also rivets 21 which hold said reinforcing plate securely fastened to the rim, said rivets are passed through tapered apertures in the rim in a manner similar to the neck of the spoke and likewise burred or otherwise treated so that the neck of the rivet 22 will expand and spread against the sides of the tapered holes or apertures as will be seen in Figure 2.

Figure 4 illustrates how the principles of mechanics are applied to the present invention, and how the construction described takes advantage of these principles, distributing the action of the forces acting on the rim.

Having thus described my invention, I claim:

In a pulley, a center boss, a rim extending around said center boss, a plurality of radially extending spokes each having one end attached to the center boss for supporting said rim, an exteriorly threaded part arranged on the outer end of each of said spokes and being of greater diameter than the major portion of said spoke, a shoulder arranged on each of said threaded parts, there being a plurality of tapered apertures extending through said rim, a flared neck arranged on the outer end of each of said spokes and shaped to fit the tapered apertures, a plurality of reinforcing plates arranged contiguous to the inner surface of said rim and each having an interiorly threaded boss threadedly engaging the threaded parts on the spokes, said reinforcing plates including a wing that is tapered outwardly from the boss on the plate in the direction of the edges of the rim, a lock nut arranged in threaded engagement with each of said threaded parts for securely locking the reinforcing plate against the rim, rivets securing the wings of the plate to the rim, there being a plurality of tapered apertures in said rim through which a portion of the rivets are passed, and said portions and last-named apertures having the same shape.

JOHN HENRY DUXBURY.

REFERENCES CITED

The following references are of record in the file of this patent:

UNITED STATES PATENTS

| Number | Name | Date |
|---|---|---|
| 322,898 | Carey | July 28, 1885 |

FOREIGN PATENTS

| Number | Country | Date |
|---|---|---|
| 14,790 of 1928 | Australia | Sept. 27, 1929 |